Figure 1:
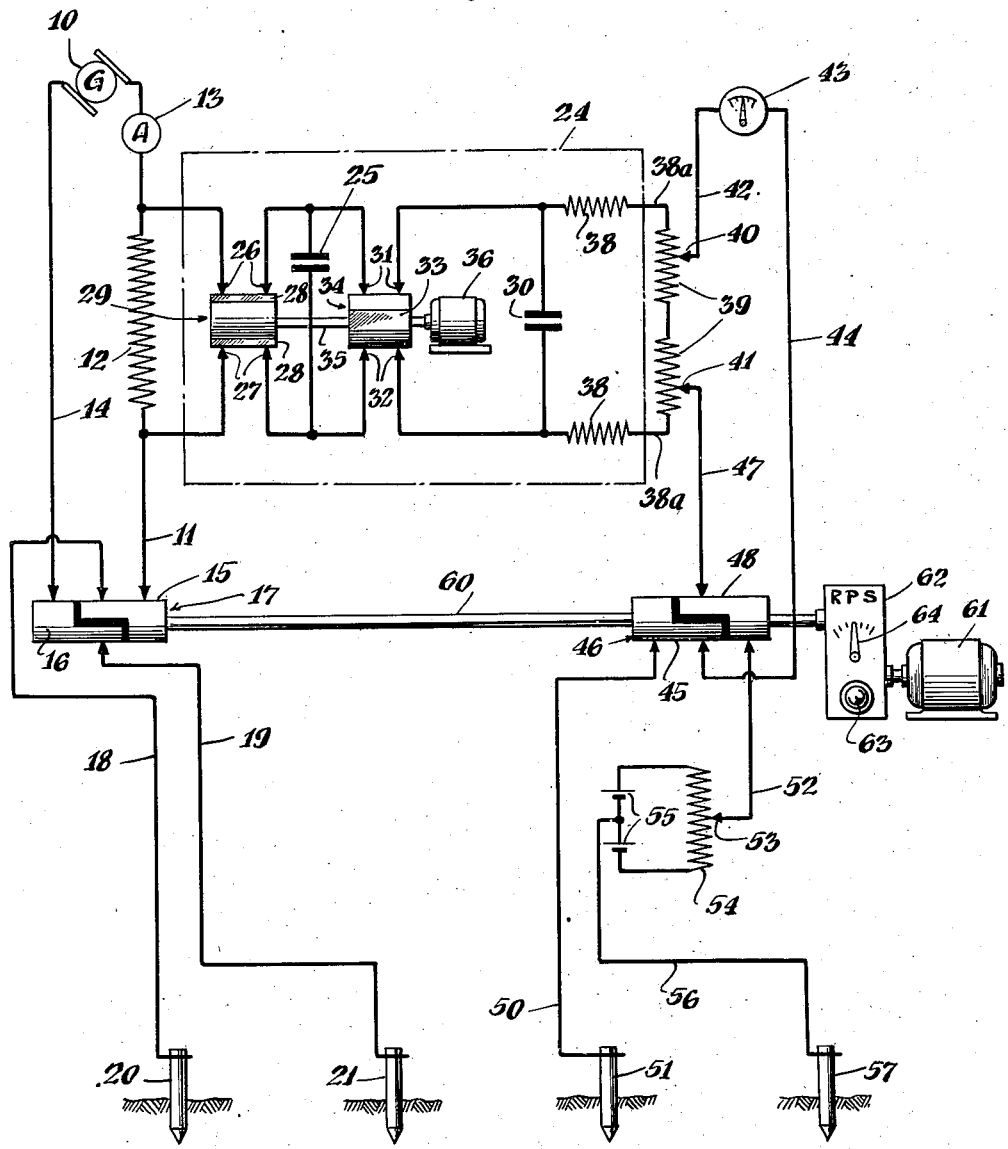

March 30, 1943.  H. M. EVJEN  2,314,873
APPARATUS FOR MAKING GEOPHYSICAL EXPLORATIONS
Filed Sept. 27, 1941   2 Sheets-Sheet 1

INVENTOR.
Haakon M. Evjen
BY
ATTORNEY

March 30, 1943.  H. M. EVJEN  2,314,873
APPARATUS FOR MAKING GEOPHYSICAL EXPLORATIONS
Filed Sept. 27, 1941  2 Sheets-Sheet 2
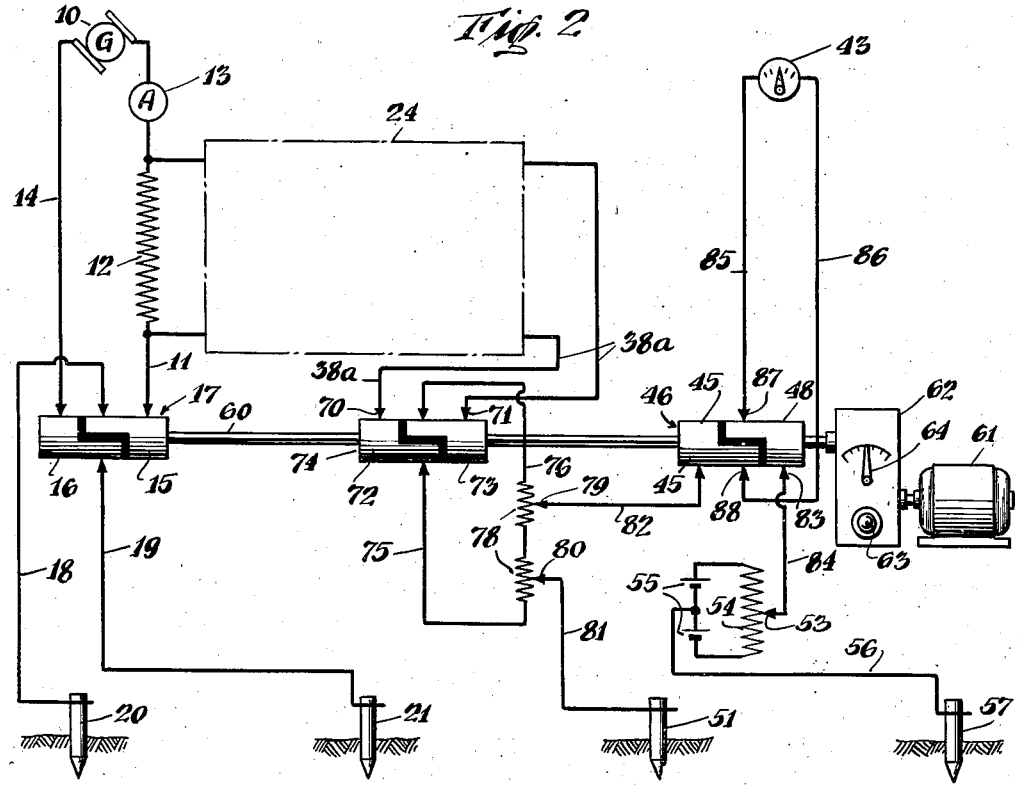
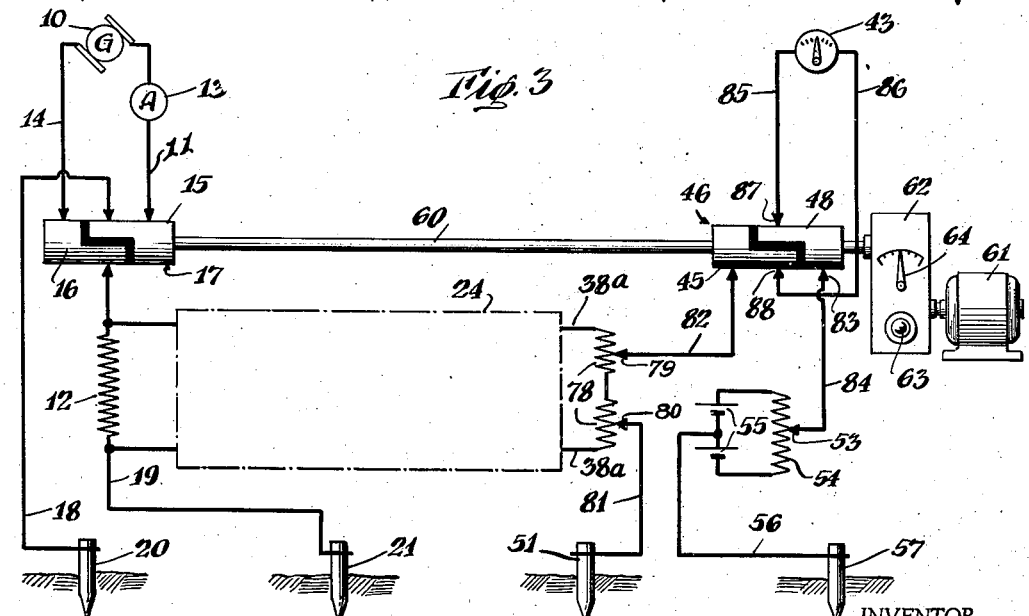
INVENTOR.
Haakon M. Evjen
BY
ATTORNEY Patented Mar. 30, 1943

2,314,873

UNITED STATES PATENT OFFICE 2,314,873

APPARATUS FOR MAKING GEOPHYSICAL EXPLORATIONS

Haakon M. Evjen, Houston, Tex., assignor to Nordel Corporation, Houston, Tex., a corporation of Delaware Application September 27, 1941, Serial No. 412,622

7 Claims. (Cl. 175—182)

This invention relates to a method of making geological explorations and more particularly to a novel and improved method of electrical prospecting and to an apparatus for carrying out the same.

In the potential method of electrical prospecting, the impedance of the earth at various points and depths is determined by passing an electrical current through the earth between a pair of current electrodes and measuring the potential difference between two other points adjacent the earth's surface within the field of influence of the earth current thus produced. Measurements of this type require the simultaneous reading of the earth current and of the induced potential and the computation of the earth's apparent resistivity from these values. Such methods are difficult to operate in the field due to the necessity for accurately regulating the current and making two accurate readings simultaneously. Furthermore, after the readings are obtained, it is necessary to compute the corresponding apparent resistivity before the results can be interpreted.

It is an object of the present invention to provide a system of the above type in which the necessity for making a plurality of simultaneous measurements is eliminated.

Another object is to provide a measuring system which may be calibrated in units which represent the geophysical condition of the earth at the points being investigated, so that the readings may be interpreted directly without the necessity for mathematical calculations.

Another object is to provide a novel and improved system for measuring the geophysical aspects of the earth at various depths.

Various other objects and advantages will be apparent as the nature of the invention is more fully disclosed.

Although the novel features which are believed to be characteristic of this invention are more particularly pointed out in the claims appended hereto, the invention itself may be better understood by referring to the following description, taken in connection with the accompanying drawings, in which certain specific embodiments thereof have been set forth for purposes of illustration.

In the drawings,

Fig. 1 is a schematic representation of an electrical prospecting system embodying the present invention; and Figs. 2 and 3 are similar schematic representations illustrating different embodiments of the invention.

In accordance with the present invention, a potential measurement is obtained which bears a definite relationship to the current flowing through the earth between the current electrodes. For example, the potential used for measuring is essentially proportional to the current flowing between the current electrodes. Inasmuch as the potential difference between the two probe electrodes is also proportional to this current, it is unnecessary to make independent measurements of either the actual current or the actual potential, because the measuring potential automatically places the measured potential on a unit current basis. This furnishes a directly measured quantity immediately suitable for interpretation.

The present invention accordingly provides a means for obtaining a measuring potential which bears a definite relationship to the current flowing in the earth circuit and may be compared with the potential induced between the measuring or potential electrodes.

In a system of this type, it is preferable in order to avoid current flow between the circuits, to have no direct ohmic connection, other than the earth itself, between the current portion of the circuit and the potential portion of the circuit. However, it is necessary that there be some type of coupling between the source of the measuring potential and the current branch of the circuit in order to obtain a definite relation between the current and the measuring potential.

In accordance with the present invention, this is accomplished by alternately charging a condenser to a potential determined by the potential drop across a resistance connected in the earth current circuit, and then discharging said condenser into a second condenser connected across a potentiometer. The potential drop thus developed across the potentiometer bears a definite relationship to the current flowing in the first mentioned resistance and in the earth circuit. The measuring potential is taken from the potentiometer and may be adjusted to exactly counter-balance the potential being measured. A galvanometer or the like may be used for determining when an exact balance is reached.

The only reading which is required in this system is the setting of the potentiometer by which the measuring potential is obtained. This potentiometer may be calibrated in suitable units which correspond to the earth's electrical characteristics and may be interpreted to indicate the variations in the earth's apparent resistivity without further calculations.

It has been found that in electrical prospecting, direct current or very low frequency alternating currents, such as frequencies of from one-half to twenty cycles per second, are necessary in order to penetrate to substantial depths such, for example, as depths below 2000 ft. High frequency currents do not penetrate the earth to any great distance. The present system accordingly is adapted for obtaining a set of measurements, termed a potential spectrum, taken between fixed points at different low frequencies. A set of such potential spectra taken at different locations on the earth's surface may be interpreted according to well known electrical prospecting methods to give an indication of the nature and distribution of the subterranean strata. Such measurements are particularly useful in prospecting for oil bearing strata and the presence of oil may frequently be detected directly due to the electrical characteristics of the oil-bearing strata as compared to the usual earth strata.

The extremely low frequencies may be readily obtained by various means, such, for example, as a commutator driven at controlled speeds, or by suitable reversing relays which may be actuated by controlled oscillators, or in various other ways. In such a system the earth current and the induced potential in the measuring circuit are reversed in synchronism so that a uni-directional potential is obtained for purposes of measurement.

One embodiment of this invention is shown more in detail in Fig. 1. Referring to this figure, the earth current circuit comprises a source 10 of direct current, such as a generator or battery. The source 10 is connected in series circuit with a line 11, a resistance 12, an ammeter 13 and a line 14. Lines 11 and 14 are connected to segments 15 and 16 respectively of a commutator 17 which is driven by suitable means to be described. Alternating current is taken from the commutator 17 by means of lines 18 and 19 respectively which are connected to suitable ground electrodes 20 and 21 herein referred to for convenience as current electrodes. The current electrodes 20 and 21 are spaced a convenient distance apart, which may be of the order of several thousand feet, and when the commutator 17 is driven at a suitable speed, an alternating current having a frequency corresponding to the speed of rotation of the commutator, passes through the earth circuit. This current may be measured by the ammeter 13 and may be adjusted within desired limits by suitable regulation of the source 10.

It will be noted that a potential drop is built up across the resistance 12 which is directly proportional to the current flowing in the earth circuit. This potential drop is utilized in the present system for obtaining the measuring potential.

For this purpose, a coupling circuit 24 is provided comprising a condenser 25 connected across the resistance 12 through pairs of contacts 26 and 27 which are interemittently closed by contact strips 28 of a rotary switch 29. The condenser 25 is intermittently connected across a second condenser 30 by pairs of contacts 31 and 32 which are intermittently closed by contact strips 33 of a rotary switch 34. The rotary switches 29 and 34 are shown as mounted on a shaft 35 and driven by a motor 36. The contact strips 28 and 33 are offset so that the rotary switches are never closed at the same time. The condenser 30 is connected with resistances 38 and leads 38a across a potentiometer 39 having variable contacts 40 and 41. The contact 40 is connected by a line 42 to a galvanometer 43 and thence through a line 44 to a reversing commutator 46. The contact 41 is connected by a line 47 to said commutator 46. Segment 45 of the commutator 46 is connected by a line 50 to an earth potential electrode 51. Segment 48 of the commutator 46 is connected by a line 52 to the movable contact 53 of a potentiometer 54 which is connected across a battery 55. The midpoint of this battery 55 is connected by a line 56 to an earth potential electrode 57. The commutators 17 and 46 are shown as mounted on a common shaft 60 and as driven in synchronism by a motor 61 through a suitable control box 62 which may comprise a gear box and a rheostat for adjusting the motor speed. A control handle 63 is provided for controlling the motor speed as desired. The speed of rotation of the commutator may be indicated by a speed indicator 64.

The galvanometer 43 is preferably of the highly damped type so that it is influenced only by the direct current component and not by any ripple or other alternating current component in the circuit under measurement.

*Operation*

In the operation of this system, the current electrodes 20 and 21 are located at selected points in the earth and the potential electrodes 51 and 57 are located at points within the field of influence of the earth currents produced between the current electrodes. The source 10 is adjusted to pass a predetermined amount of current through the earth circuit, as indicated by the ammeter 13. The frequency of alternation of the current is regulated by making suitable adjustment of the control handle 63. If the measurements are to be taken with direct current, the commutator 17 remains stationary. For low frequency alternating current, the commutator is slowly rotated at the selected speeds as indicated by the speed indicator 64. It will be noted that the potential drop in the resistance 17 will vary in proportion to the amount of current flowing in the earth circuit.

The condenser 25 which is intermittently connected across the resistance 12 by means of the rotary switch 29 receives at each such connection a charge which is proportional to the potential drop across said resistance. The circuit between the condenser 25 and the resistance 12 is then broken by the switch 29 and the circuit between the condenser 25 and the condenser 30 is established by the closing of the switch 34. The condenser 25 then discharges into the condenser 30, which accumulates the successive charges and attains a potential which is proportional to the average potential drop across the resistance 12 and which varies in accordance with fluctuations in said potential drop. The resistances 38 are of sufficiently high value to allow only a small fraction of the total charge of condenser 30 to leak off between successive charging periods. In this way, the condenser 30 is charged to a potential which is maintained at an average value proportional to the potential drop across resistance 12.

The charge upon the condenser 30 determines the voltage drop across the potentiometer 39 and the average value of this voltage drop is at all times proportional to the voltage drop through the resistance 12 which, in turn, is determined by the total current flowing in the earth circuit.

With the circuit operating in this manner, suitable adjustments are made of the contacts 40 and 41 to produce a zero reading on the galvanometer 43 which indicates that the average voltage drop across the intermediate portion of the potentiometer 39 between the contacts 40 and 41 exactly balances the potential which is picked up by the earth potential electrodes 51 and 57 after the latter has been rectified by commutator 46.

The potential picked up by the potential electrodes corresponds in frequency to the frequency of the earth current. The alternating potential is rectified by the commutator 46 which operates in synchronism with earth current commutator 17 to supply a direct voltage across the galvanometer 43 and to the potentiometer 39.

The effect of any residual earth current which would tend to produce a constant direct potential across the electrodes 51 and 57 is eliminated by suitable adjustment of the potentiometer 54. This adjustment may be made, for example, while no current is flowing through the earth circuit so that the only effect on the galvanometer 43 represents the effect of the residual earth current. Since the earth current impresses a direct current potential across the probe (or potential) electrode, any unbalance between this potential and the potential taken from potentiometer 54, will appear as an alternating potential after commutation by commutator 46. This will make the galvanometer kick from one side to the other in synchronism with the commutation. Any drift in the natural earth potential may thus be immediately perceived, and can be compensated by readjusting potentiometer 54 until the kicking of the galvanometer is eliminated.

The potentiometer 39 is never connected directly to the resistance 12 inasmuch as the switches 29 and 34 are never closed at the same time. Consequently, there is no direct ohmic connection in the coupling between potentiometer 39 and resistance 12. Even though the lowest potential of resistance 12 may be considerably higher than ground potential, and potentiometer 39 is directly connected to ground by leads 47 and 50, it is impossible for the potential difference between resistance 12 and electrode 51 to produce a current. Thus, only the differential drop of potential across resistance 12 is effective in producing the potential across potentiometer 39, and this potential may be used for the purpose of measurement without further complications. A filter may be included in the measuring circuit if desired in order to eliminate ripples or fluctuations from various causes such, for example, as those produced by the action of the commutators.

The potentiometer 39 may be suitably graduated in convenient units and when the balance is obtained, the reading corresponding to the point of adjustment is noted. The frequency is also noted from the indicator 64. This reading, taken from the potentiometer 37, represents a definite earth characteristic at a depth which is determined by the penetration of the earth current at the particular frequency at which the mesurement is being taken. The potential developed across the potentiometer 39 being dependent upon the total value of the earth current at the instant that the measurement is being taken, automatically compensates for any variations in electrode resistance or in contact resistance and eliminates any necessity for making simultaneous measurements of the earth current and the induced potential.

This measurement is repeated with different frequencies until a complete potential spectrum of the area between electrodes 51 and 57 is obtained. These electrodes may then be moved to another location and the measurements repeated to obtain a potential spectrum at various frequencies in the manner above pointed out. The various spectra thus obtained may be interpreted to show the characteristics of the earth's strata in the area under investigation. It is to be understood, of course, that the potential electrodes may be variously positioned with respect to the current electrodes 20 and 21 and that the positions thereof may be changed in accordance with the depth which is under investigation at any particular instant.

It will be noted that in the above described system only a single reading need be taken and the necessity for mathematical calculations is avoided. The system is accordingly well adapted to field use and may be operated by unskilled persons. The data thus compiled may be interpreted by geological physicists in accordance with well known principles.

The size of the electrodes may vary over wide limits. In practice, metal stakes about one or two inches in diameter and 3 ft. or 4 ft. in length have been found satisfactory. The distance between the current electrodes may vary widely, for example, from 200 ft. to 5000 ft., depending upon the depth to be investigated. The potential of the source 10 may likewise be adjusted as desired. Voltages of 100 volts to 200 volts and earth currents of one to two amperes have been found satisfactory.

In the embodiment shown in Fig. 2 parts corresponding to Fig. 1 are given the same reference numbers. The coupling circuit indicated by the rectangle 24 is identical with the coupling circuit included in the rectangle 24 of Fig. 1. It is to be noted that the measuring voltage is taken from the direct current side of the current commutator 17 as in Fig. 1, but is applied to the alternating current side of the commutator 46. The segment 48 of the commutator 46 is connected by a brush 83 and lead 84 to the contact 53 of the potentiometer 54. The galvanometer 43 is connected by leads 85 and 86 and brushes 87 and 88 to the commutator 46. The lines 38a are connected by brushes 70 and 71 to segments 72 and 73 respectively of a commutator 74 which is mounted on the shaft 60 and is driven in synchronism with the commutators 17 and 46. The commutator 74 is connected by lines 75 and 76 across a potentiometer 78 having variable contacts 79 and 80. The contact 79 is connected by a line 82 to the segment 45 of the commutator 46. The contact 80 is connected by a line 81 to the potential electrode 51. The remaining elements are identical with those shown and described in Fig. 1.

In this embodiment the measuring potential derived from the condenser 30 is reversed by means of commutator 74 in synchronism with the reversals of the earth current and is applied to the potential circuit on the alternating current side of the commutator 46. The potential derived from the potential electrodes 51 and 57 is balanced against the potential taken from the potentiometer 78, is rectified by the commutator 46 and is applied as a direct current to the galvanometer 43. The operation is otherwise identical with the system shown in Fig. 1.

In the embodiment shown in Fig. 3 the various parts are similar to Fig. 1 and given corresponding reference characters. In this embodiment, however, the coupling circuit indicated by the rectangle 24 is connected between the alternating current side of the commutators 17 and 46. In this embodiment the ammeter 13 is connected by the lead 11 directly to segment 15 of the commutator 17. The resistance 12 is connected in the lead 19. The potentiometer 78 is connected as shown in Fig. 2 to the leads 81 and 82 between the commutator 46 and the potential electrode 51. The other elements are connected as previously described and operate in a similar manner.

It is to be understood that the commutators 17, 46 and 74 are shown as rotary commutators merely for purposes of illustration and that any suitable synchronized reversing means may be used for reversing the current in the respective circuits so as to obtain the balancing and measuring effect above described. Furthermore, any suitable means may be used for controlling the rate of operation of such commutators for thereby varying the frequency of the measuring current so as to obtain the desired frequency spectrum of the various localities under measurement. Likewise, the switches 29 and 34 may be of any desired form suited to alternately connect the condenser 25 to the resistance 12 and to the condenser 30 and to avoid the establishment of a direct ohmic connection at any time between the condenser 30 and the earth current circuit.

Although certain specific embodiments of the invention have been shown for purposes of illustration, it is to be understood that the invention is not to be limited thereto but that various changes and modifications may be made therein as will readily appear to a person skilled in the art. The invention is only to be limited in accordance with the scope of the following claims.

What is claimed is:

1. A system for electrical prospecting, comprising an earth current circuit including a source of direct current, a pair of spaced earth electrodes, and reversing means connected between said source and said electrodes for reversing the direct current at a predetermined controlled frequency whereby an earth current having a predetermined frequency is passed through the earth between said electrodes, a potential circuit including potential pick-up electrodes located at spaced points adjacent the earth's surface lying within the field of influence of said earth current, a direct current indicating device connected to indicate the potential of said potential circuit, and reversing means synchronized with said first reversing means and connected between said potential pick-up electrodes and said indicating device to convert the picked-up potential difference into a uni-directional potential suited to actuate said indicating device, and coupling means connected between said earth current circuit and said potential circuit to impress on said potential circuit a balancing potential which is directly proportional to the current flowing in said earth current circuit at the instant of measurement, said coupling means comprising a resistance connected in series with said earth current circuit to develop a potential drop thereacross proportional to the current flowing in said earth current circuit, a potentiometer connected in said potential circuit to apply thereto a potential drop opposing the potential picked up from said potential pick-up electrodes, a condenser connected across said potentiometer, a second condenser, and synchronized switch means connected to alternately connect said second condenser across said resistance and across said first condenser, whereby said second condenser periodically receives a charge from the potential drop across said resistance and applies the same to said first condenser for thereby building up a charge in said first condenser which is proportional to the potential drop across said resistance.

2. A system for electrical prospecting, comprising an earth current circuit including a source of direct current, a pair of spaced earth electrodes, and reversing means connected between said source and said electrodes for reversing the direct current at a predetermined controlled frequency whereby an earth current having a predetermined frequency is passed through the earth between said electrodes, a potential circuit including potential pick-up electrodes, a potential circuit including potential pick-up electrodes located at spaced points adjacent the earth's surface lying within the field of influence of said earth current, a direct current indicating device connected to indicate the potential of said potential circuit, and reversing means synchronized with said first reversing means and connected between said potential pick-up electrodes and said indicating device to convert the picked-up potential difference into a uni-directional potential suited to actuate said indicating device, and coupling means connected between said earth current circuit and said potential circuit to impress on said potential circuit a balancing potential which is directly proportional to the current flowing in said earth current circuit at the instant of measurement, said coupling means comprising a resistance connected in series with said earth current circuit to develop a potential drop thereacross proportional to the current flowing in said earth current circuit, a potentiometer connected in said potential circuit to apply thereto a potential drop opposing the potential picked up from said potential pick-up electrodes, a condenser connected across said potentiometer, a second condenser, and synchronized switch means connected to alternately connect said second condenser across said resistance and across said first condenser, whereby said second condenser periodically receives a charge from the potential drop across said resistance and applies the same to said first condenser for thereby building up a charge in said first condenser which is proportional to the potential drop across said resistance, and high resistances connected in series circuit with said first condenser and said potentiometer to retard the leakage of the charge from said first condenser between successive applications of charges thereto from said second condenser whereby said first condenser retains a charge which is proportional to the potential drop across said resistance.

3. A system for electrical prospecting, comprising an earth current circuit including a source of direct current, a pair of spaced earth electrodes, and reversing means connected between said source and said electrodes for reversing the direct current at a predetermined controlled frequency whereby an earth current having a predetermined frequency is passed through the earth between said electrodes, a potential circuit including potential pick-up electrodes located at spaced points adjacent the earth's surface lying within the field of influence of said earth current, a direct current indicating device connected to indicate the potential of said potential circuit, and reversing means synchronized with said first reversing means and connected between said potential pick-up electrodes and said indicating device to convert the picked-up potential difference into a uni-directional potential suited to actuate said indicating device, and coupling means connected between said earth current circuit and said potential circuit to impress on said potential circuit a balancing potential which is directly proportional to the current flowing in said earth current circuit at the instant of measurement, said coupling means comprising a resistance connected in series with said earth current circuit to develop a potential drop thereacross proportional to the current flowing in said earth current circuit, a potentiometer connected in said potential circuit to apply thereto a potential drop opposing the potential picked up from said potential pick-up electrodes, a condenser connected across said potentiometer, a second condenser, and synchronized switch means connected to alternately connect said second condenser across said resistance and across said first condenser whereby said second condenser periodically receives a charge from the potential drop across said resistance and applies the same to said first condenser for thereby building up a charge in said first condenser which is proportional to the potential drop across said resistance, and means in said potential circuit to balance the residual earth potential, said means comprising a potentiometer connected in said earth current circuit and a source of potential connected across said potentiometer to produce a voltage drop therein, said potentiometer having adjustable contacts whereby the value of said balancing potential may be adjusted as required.

4. The system set forth in claim 1 in which said resistance is connected on the direct current side of the reversing means of said earth current circuit and said potentiometer is connected on the direct current side of the reversing means of said potential circuit.

5. The system set forth in claim 1 in which said resistance is connected on the alternating current side of the reversing means of said earth current circuit and said potentiometer is connected on the alternating current side of the reversing means of said potential circuit.

6. The system set forth in claim 1 in which said resistance is connected on the direct current side of the reversing means of said earth current circuit, the potentiometer is connected on the alternating current side of the reversing means of said potential circuit, and a reversing means synchronized with said first reversing means is provided for reversing the coupling to said potentiometer from said coupling circuit, whereby the potential drop in said potentiometer corresponds in direction to the potential pick-up by said potential pick-up electrodes.

7. A system for electrical prospecting, comprising an earth current circuit including a pair of spaced earth electrodes, a source of current connected thereto, reversing means connected between said source and said electrodes for reversing the earth current at a predetermined controlled frequency, a potential circuit including potential pick-up electrodes located at spaced points adjacent the earth's surface lying within the field of influence of said earth current, a direct current indicating device connected to indicate the potential of said potential circuit, reversing means synchronized with said first reversing means and connected between said potential pick-up electrodes and said indicating device to convert the picked-up potential difference into a uni-directional potential suited to actuate said indicating device, and coupling means connected between said earth current circuit and said potential circuit to impress on said potential circuit a balancing potential which is directly proportional to the current flowing in said earth current circuit at the instant of measurement, said coupling means comprising a resistance connected with said earth current circuit to develop a potential drop thereacross proportional to the current flowing in said earth current circuit, a condenser, switch means operating successively to connect said condenser across said resistance to be charged in accordance with the voltage drop thereacross and to disconnect said condenser from said resistance and to connect said condenser to said potential circuit to supply thereto a potential opposing the picked up potential, and means adjusting the relationship between the potential drop across said resistance and the potential supplied to said pick-up circuit by said condenser to obtain a balancing potential suited to produce a zero reading in said indicating device.

HAAKON M. EVJEN.